Patented Mar. 30, 1926.

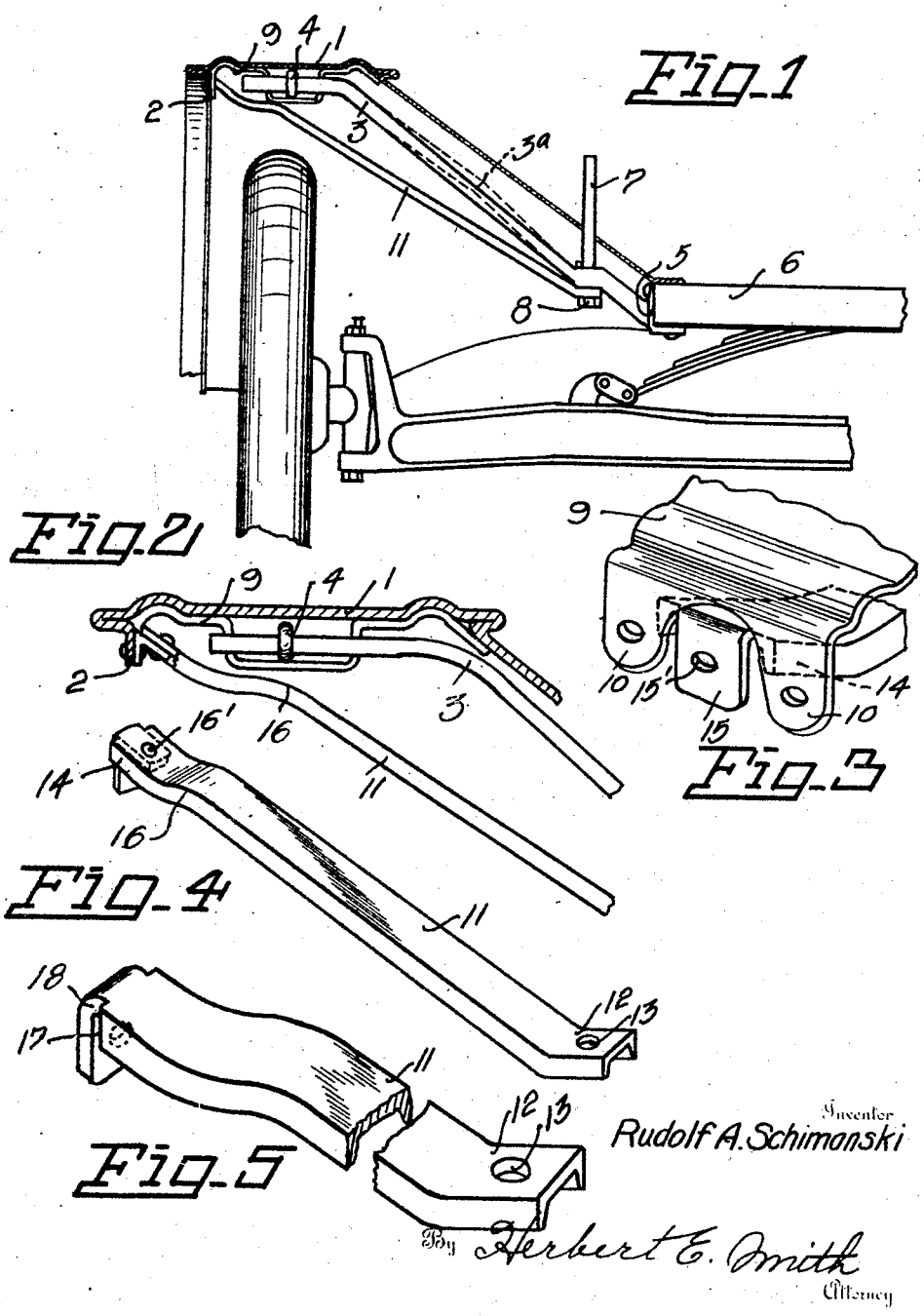

1,578,473

UNITED STATES PATENT OFFICE.

RUDOLF A. SCHIMANSKI, OF SPOKANE, WASHINGTON.

FENDER BRACE.

Application filed July 21, 1924. Serial No. 727,250.

*To all whom it may concern:*

Be it known that I, RUDOLF A. SCHIMANSKI, a citizen of the United States, residing at Spokane, in Spokane County and State of Washington, have invented certain new and useful Improvements in Fender Braces, of which the following is a specification.

My present invention relates to improvements in fender braces for the mud guards or wheel fenders of automobiles. As is well known the supporting structure for the mud guards or wheel fenders of the Ford type of cars, and particularly the fenders of the front wheels of these cars or automotive vehicles, after being in use for a time, and due to the vibrations of the car in part, have a tendency to fail in the proper performance of their functions. Because of this tendency in the original supporting structure a condition soon arises resulting in rattling of the fender or its support while the car is in motion, and in displacement of parts from their original positions. The primary object of my invention is the provision of an auxiliary brace used in connection with the original supporting structure or equipment of the manufactured car, for maintaining the fender and its supporting structure in proper position and for preventing loosening of parts with consequent rattling. The device of my invention is readily adapted for use without material change to the existing structure or equipment, and it can be applied for use with facility, and without necessity for skilled labor or special tools.

In the accompanying drawings I have illustrated one complete example and a slightly modified form of the auxiliary brace, combined and arranged in the supporting structure of the fender according to the best mode I have thus far devised for the practical application of the principles of my invention.

Figure 1 is a view in front elevation of so much of an automobile structure as is necessary for an illustration of my invention; for convenience of illustration the fender is shown in section.

Figure 2 is an enlarged detail view showing a fender in section and the arrangement of parts at the outer end of the auxiliary brace.

Figure 3 is a detail perspective view showing the relation of the outer end of the auxiliary brace to the fender and the attaching means for said brace to the fender.

Figure 4 is a perspective view of the auxiliary brace detached.

Figure 5 is an enlarged perspective view of a slightly modified form of the auxiliary brace.

In order that the relation and assembly of parts may readily be understood I have shown in the drawings the well known type of fender 1, with its flange 2 along its outer edge, and supported by the fender iron or brace bar 3. For purposes of my invention this brace bar is bent or arched as at 3ª in Figure 1 in order that it may, in combination with my auxiliary brace, form a stable and durable supporting structure for the fender. The fender iron or brace bar 3 at its outer end is attached to the fender through the eye-bolt connection 4 beneath the fender, and the inner or lower end 5 of this brace bar 3 is anchored to a part of the frame as 6.

The lamp post or standard 7 and its attaching nut 8 supported in the brace bar are utilized as will be explained.

Beneath the fender and extending transversely thereof is secured a brace plate 9 having perforated lugs 10 10 spaced apart as seen in Figure 3 for attachment to the flange 2 of the fender, for reinforcing the fender structure and for use in conjunction with the eye bolt 4. The perforated lugs 10 are riveted to the flange of the fender as usual in this type of construction.

The auxiliary brace 11 is utilized in connection with the brace bar 3 as a wide support for the fender and its inner end is anchored to the lamp post or standard 7 by means of the nut 8. The inner end of the auxiliary brace bar 11 is bent as at 12 and perforated at 13 to conform to the angular shape of the brace bar 3 and to fit up over the threaded lower end of the lamp post. From this point of attachment on the bolt or standard 7 the brace bar 3 and the auxiliary brace diverge, but they both extend upwardly and outwardly in the same vertical plane with their ends passing transversely beneath the fender. Preferably the auxiliary brace is a channel iron as indicated in Figures 4 and 5 to insure lightness and strength. At its upper outer end the auxiliary brace is bent as indicated at 16 to avoid the outer end of the brace bar 3, and an angular attaching bracket is carried at the outer end of the auxiliary brace which is located between the two attaching lugs 10

10 of the reinforcing plate 9. This bracket is secured by rivets to the inner side of the flange 2 of the fender.

In Figure 4 the angular bracket for attaching the auxiliary brace to the fender flange is shown as an angle iron 15 having one portion secured to the bent end 14 of the auxiliary brace by means of a rivet 16', and the angle iron is provided with a rivet hole 15' for the rivet which secures said iron to the fender flange between the two perforated lugs 10 of the reinforcing plate.

In Figure 5 the channel iron auxiliary brace has its side flanges cut away at 17 and the web of the channel iron is bent as at 18 to form the attaching bracket that is riveted to the fender flange. Either of these two forms of angle bracket may be used to advantage under differing conditions.

As thus described and illustrated the supporting structure is anchored rigidly to the car frame and projects upwardly and outwardly over the wheel and under the fender to assure a rigid and strong brace with wide supporting area for the fender, and due to its compact arrangement the supporting structure does not occupy excessive space nor does it interfere with the existing equipment of the automobile.

In some instances the riveting of the angle bracket to the fender flange may be omitted, as the angle bracket 18 located between the two perforated lugs of the reinforcing plate or saddle 9 and bearing against the inner face of the fender flange 2, will be sufficient for supporting the fender from the auxiliary brace bar.

Having thus fully described my invention, what I claim as new and desire to secure by Letters Patent is—

The combination in a fender support with an arched brace bar having its inner end secured to a fixed support, and a lamp post in said brace bar, of an auxiliary brace bar having its inner end secured on said post to the first brace bar, and an angular bracket at the outer end of the auxiliary brace bar for engagement with a fender.

In testimony whereof I affix my signature.

RUDOLF A. SCHIMANSKI.